United States Patent [19]

Petrak

[11] Patent Number: 4,968,044
[45] Date of Patent: Nov. 6, 1990

[54] ROTARY FACIAL SEAL AND BEARING ASSEMBLY

[75] Inventor: Gregory H. Petrak, Lakewood, Colo.

[73] Assignee: P and C Engineering and Development, Boulder, Colo.

[21] Appl. No.: 282,683

[22] Filed: Dec. 12, 1988

Related U.S. Application Data

[63] Continuation-in-part of Ser. No. 132,771, Dec. 14, 1987.

[51] Int. Cl.⁵ .................. F16J 15/54; F16C 33/74; F16C 33/76
[52] U.S. Cl. ........................... 277/95; 277/88; 277/152; 277/212 C; 384/140; 384/141; 384/482
[58] Field of Search .................. 277/58, 65, 82, 84, 277/88–90, 95, 12, 152, 153, 212 C, 212 FB; 389/138–143, 147, 148, 481, 482, 484, 485, 489

[56] References Cited

U.S. PATENT DOCUMENTS

| | | | |
|---|---|---|---|
| 2,399,764 | 5/1946 | Schilling | 286/11 |
| 2,482,029 | 9/1949 | Reynolds | 286/5 |
| 2,635,907 | 4/1953 | Heimbuch | 286/2 |
| 2,926,938 | 3/1960 | Ratti | 286/5 |
| 2,994,547 | 8/1961 | Dolhun et al. | 286/11.13 |
| 3,120,959 | 2/1964 | Jensen et al. | 277/89 |
| 3,326,559 | 6/1967 | Persons | 277/95 |
| 3,370,856 | 2/1968 | Buske | 277/89 |
| 3,495,843 | 2/1970 | Anderson et al. | 277/183 |
| 3,606,363 | 9/1971 | Jordan | 277/237 |
| 3,642,335 | 2/1972 | Takahashi et al. | 308/187.1 |
| 3,727,923 | 4/1973 | McEwen | 277/9 |
| 3,813,102 | 5/1974 | Derman | 384/484 |
| 4,171,819 | 10/1979 | Martineau | 277/88 |
| 4,212,473 | 7/1980 | Arai | 277/81 P |
| 4,245,233 | 1/1981 | Arai | 277/81 P |
| 4,251,082 | 2/1981 | Little | 277/87 |
| 4,275,890 | 6/1981 | Reinsma | 277/84 |
| 4,284,281 | 8/1981 | Reinsma | 277/84 |
| 4,311,315 | 1/1982 | Kronenberg | 277/95 |
| 4,457,519 | 7/1984 | Harrington | 277/65 |
| 4,502,698 | 3/1985 | Collins | 277/43 |
| 4,572,523 | 2/1986 | Guettouche et al. | 277/207 A |
| 4,588,195 | 5/1986 | Antonini et al. | 277/153 |
| 4,763,905 | 8/1988 | Zvonar | 384/484 |

FOREIGN PATENT DOCUMENTS

| | | | |
|---|---|---|---|
| 464974 | 7/1946 | Canada | 277/89 |
| 1061144 | 7/1959 | Fed. Rep. of Germany | 277/88 |
| 2549465 | 5/1977 | Fed. Rep. of Germany | 384/480 |
| 1013310 | 4/1952 | France | 277/90 |
| 1024718 | 1/1953 | France | 277/153 |
| 1168769 | 3/1957 | France | 384/484 |
| 1414408 | 11/1975 | United Kingdom | 277/89 |

*Primary Examiner*—Allan N. Shoap
*Assistant Examiner*—Scott Cummings
*Attorney, Agent, or Firm*—John E. Reilly

[57] ABSTRACT

A rotary facial seal and a thrust bearing are adapted to be installed between inner and outer concentric relatively movable members, such as, the spindle housing and axle of a motor vehicle, the facial seal having an annular diaphragm made up of an inner seating portion mounted on the axle, an outer sealing lip tapering away from a hinged section in a seal body to engage a radial wall of the housing, and an intermediate resilient wall section between the seal lip and seating portion to yieldingly urge the sealing lip into a thin band of contact with the radial wall under the biasing action of the intermediate wall section; and the thrust bearing includes a bearing member which is installed at the inner bore of the spindle housing and is freely rotatable with respect to the spindle housing when engaged by the end of the shaft and inner seating portion of the facial seal.

13 Claims, 5 Drawing Sheets

ROTARY FACIAL SEAL AND BEARING ASSEMBLY

CROSS REFERENCE TO RELATED APPLICATIONS

This application is a continuation-in-part of Ser. No. 132,771, filed Dec. 14, 1987 by Gregory H. Petrak for "ROTARY FACIAL SEAL AND BEARING ASSEMBLY".

This invention relates to seals; and more particularly relates to a novel and improved grease or oil facial seal used alone or in combination with a bearing assembly disposed between two relatively movable or relatively rotatable parts, such as, a stationary housing and a rotatable and axially movable shaft.

BACKGROUND AND FIELD OF THE INVENTION

Diaphragm-type seals have been employed in the past in rotary seal applications, such as, between a rotating axle and a spindle housing in a motor vehicle. For example, U.S. Pat. No. 4,502,698 to M. T. Collins, entitled "ROTARY FACE SEAL WITH FLEXIBLE ANNULAR BOOT" and assigned to the assignee of this application, discloses a boot mounted in surrounding relation to a shaft or axle and terminating in an outer peripheral seal ring which has a tapered face engaging the radial wall of the outer stationary spindle housing; and a spring member urges the seal ring into firm engagement with the radial wall, the boot being free to be radially displaced in response to axial and radial movement of the axle with respect to the housing so that the seal ring will remain seated notwithstanding any pulsating or translational movement of the axle while maintaining a constant pressure over its entire circumference. In the said U.S. Pat. No. 4,502,698, the boot is of a generally S-shaped construction, and the entire seal assembly as described is effective to prevent contaminants from advancing past the radial wall of the spindle housing and into contact with the axle and other components; and, further, the boot prevents the flow of lubricating grease out of the inboard side of the spindle thereby aiding in long term protection of components both inboard and outboard of the spindle.

Generally, for most effective sealing, constant pressure should be maintained over the entire circumference of the face portion of the seal ring notwithstanding axial misalignment or eccentric orbiting which may occur as the shaft spins. Thus, it is desirable that the seal ring be so constructed and arranged as to establish a thin annular band of contact at its sealing surface with a surface to be sealed. This thin band of contact results in optimum sealing conditions and prevents contamination as well as excessive wear of the seal face otherwise occasioned when the axially directed force is spread over a more limited surface area on the seal face. The thin band of contact also has been found to establish improved sealing notwithstanding imperfections in the surface to be sealed and high rates of shaft rotation resulting in application of centrifugal forces which are exerted outwardly upon the seal ring and face. Further, it is important that the seal face be axially loaded or biased in such a way as to remain in contact with the surface to be sealed irrespective of forces exerted upon the seal face and changes in atmospheric pressure or other pressure changes which may occur as a result of translational shaft movement or sudden changes in temperature.

SUMMARY OF THE INVENTION

It is therefore an object of the present invention to provide improvements in seals, and, more particularly, to provide for a novel and improved seal. In preferred embodiments described in detail below, the seal is a facial seal adaptable for use between a spindle housing and axle in automotive applications. Features of the invention may be employed, too, in other applications and environments, as will be evident to those have ordinary skill in the art in view of the description herein.

Another object of the present invention is to provide for a novel and improved seal, particularly a facial seal, interposed between inner and outer spaced, relatively movable or relatively rotatable members which is comprised of a minimum number of parts and can be installed in a minimum amount of time.

It is a further object of the present invention to provide for a novel and improved axle grease or oil seal, especially for axles, the seal being capable of preventing the flow of contaminants past the seal to the inboard side of a housing and capable of retaining a lubricant inside the seal thereby helping to prevent damage to bearings and to enhance seal wear and longevity; and further wherein a bearing is interposed between the axle and housing in such a way as to distribute applied forces over a broad area and to reduce heat build-up and wear.

It is an additional object of the present invention to provide for a novel and improved seal assembly adaptable for use between a spindle housing and axle which incorporates favorable characteristics of a flexible rolling diaphragm so as to be self-compensating for wear, misalignment and end play and to avoid the need for separate spring elements.

It is still a further object of the present invention to provide for a novel and improved seal assembly adaptable for use between a spindle housing and axle which is capable of minimizing heat build-up and wear at high speeds of rotation while achieving optimum sealing and loading characteristics.

In accordance with the present invention, a preferred form of rotary facial seal is adapted to be disposed between an outer member, such as, for example, a stationary spindle housing and an inner member, such as, for example, an axle. The axle shaft is rotatably and axially movable with respect to the spindle housing and there is a radial wall on the housing. The seal assembly includes an annular diaphragm of elastomeric material having an inner seating portion disposed around the axle and an outer sealing lip tapering in an axial direction away from the outer periphery of the diaphragm into sealing contact with the radial wall of the housing; and the diaphragm having a toroidal-shaped intermediate wall to yieldingly urge the sealing lip into a thin annular band of contact with the radial wall of the housing whereby the sealing lip is self-compensating for wear and prevents entry of contaminants into the space between the spindle housing and axle.

The diaphragm including the seal ring and lip are preferably of unitary construction, and an outer seal body of the diaphragm joining the toroidal wall section to the seal lip is selectively reduced in cross-section to define a circumferential hinge which encourages the seal lip to flare outwardly under the biasing action of the intermediate wall section. The thin band of contact established by the seal lip with the radial wall enables applied forces to be distributed over a broader surface area than a line of contact thereby permitting faster running with less heat build-up that otherwise may tend to cause increased friction and wear as well as a tendency of the lip to stick to the radial wall surface. Rigid reinforcing rings are preferably incorporated into the inner seal ring and outer seal body, the outer ring acting as a directional fulcrum through which the force imparted by the rolling action of the wall section is directed toward the face of the seal lip.

In one preferred embodiment, the axle shaft is rotatable about a linear axis while the spindle housing remains relatively fixed; alternatively, the shaft may be fixed while the housing is rotated. Also, the seal preferably is mounted on or with respect to the shaft in generally concentric relation to the shaft and axis thereof, and the thin annular band of contact the sealing lip makes with the radial wall of the spindle housing preferably also is generally concentric with respect to the axle shaft and axis thereof. Furthermore, if desired, the spindle housing also may include a portion which is generally concentric with the shaft. Moreover, the radial wall against which the sealing lip may bear to form the thin annular band of contact may be referred to as an axial face or as a counterface.

Briefly, a seal according to one preferred embodiment of the present invention for plural members, which are relatively movable, for example, relatively rotatable or axially movable, members includes a first body or seating portion, a sealing portion, and an intermediate portion. The first body portion positions the seal in place with respect to one of the plural members, such as an axle shaft. For purposes of the description below such first body portion may be referred to as a seal ring or as an inner seal ring, e.g., due to relative location thereof in the preferred embodiment of the invention. The sealing portion provides the sealing function with respect to a second member, such as the axial face or counterface of a spindle housing. For purposes of the description below, such sealing portion may be referred to as a sealing lip. The intermediate portion, which sometimes is referred to as a toroidal-shaped wall section or toroid of a diaphragm member, couples the body portion and the sealing portion and in a sense energizes the seal to provide a sealing force that preferably accommodates axial and radial relative movement of the first and second members.

Preferably, although not necessarily, the sealing lip is located radially outward relative to the first body portion. If desired, the positional relationship of those portions and of other portions of the seal of the invention may be varied within the spirit and scope of the invention. Also, preferably a body, referred to below as an outer seal body due to relative location in the preferred embodiment, joins the toroidal-shaped wall section to the sealing lip and in a sense provides support for the sealing lip. Further, in one embodiment, a mechanism is provided to enable a hinge-like action that facilitates an outward bending or flaring of the sealing lip relative to the outer seal body in response to a biasing force or action of the toroidal-shaped wall that urges the sealing lip toward the axial face of the spindle housing; and that mechanism is a reduced cross-section portion of the outer seal body which defines a hinge, preferably a circumferential hinge. In another preferred embodiment the outer seal body is of a substantially uniform cross-section and is free to hinge or flex more about the toroidal shaped wall section than in the one embodiment so that the seal body can redirect its force along the radial wall of the spindle housing more in a radial outward direction and with minimal loading imposed on the surface area engaged by the seal.

Under the influence of the toroidal-shaped wall and outer seal body, the sealing lip forms a thin annular band of contact with the radial wall of the spindle housing, for example. Such thin annular band of contact, rather than a line of contact, enables applied forces to be distributed over a relatively broad surface area than would be the case for a line of contact; and this distribution permits faster running of the seal and apparatus on which it is used with less frictional heat build-up that otherwise may tend to cause increased friction and wear.

The seal may include one or more relatively rigid members that tend to reinforce various portions of the seal or assist in maintaining radial and axial stability of the seal. Those members may be separate from or part of one or more of the other portions of the seal and may be of metal, plastic, or other relatively rigid material. Moreover, in the preferred embodiments, one of such relatively rigid members is attached to or is incorporated into the inner seal ring to facilitate secure mounting of the seal on an axle shaft, for example; and in one of the embodiments a second relatively rigid member is attached to or is incorporated into the outer seal body to act as a directional fulcrum or leverage point through which force imparted by a rolling action of the toroidal-shaped wall is directed toward the sealing lip to seal against the axial face of the spindle housing.

A thrust bearing may be installed at the inner face of the radial wall and inner bore of the spindle housing with a seal element surrounding the axle, the bearing being freely rotatable with respect to the spindle housing and seal element.

Other objects, advantages and features of the present invention will become more readily appreciated and understood when taken together with the following detailed description in conjunction with the accompanying drawings, in which:

DETAILED DESCRIPTION OF ONE PREFERRED EMBODIMENT

Figure 1:
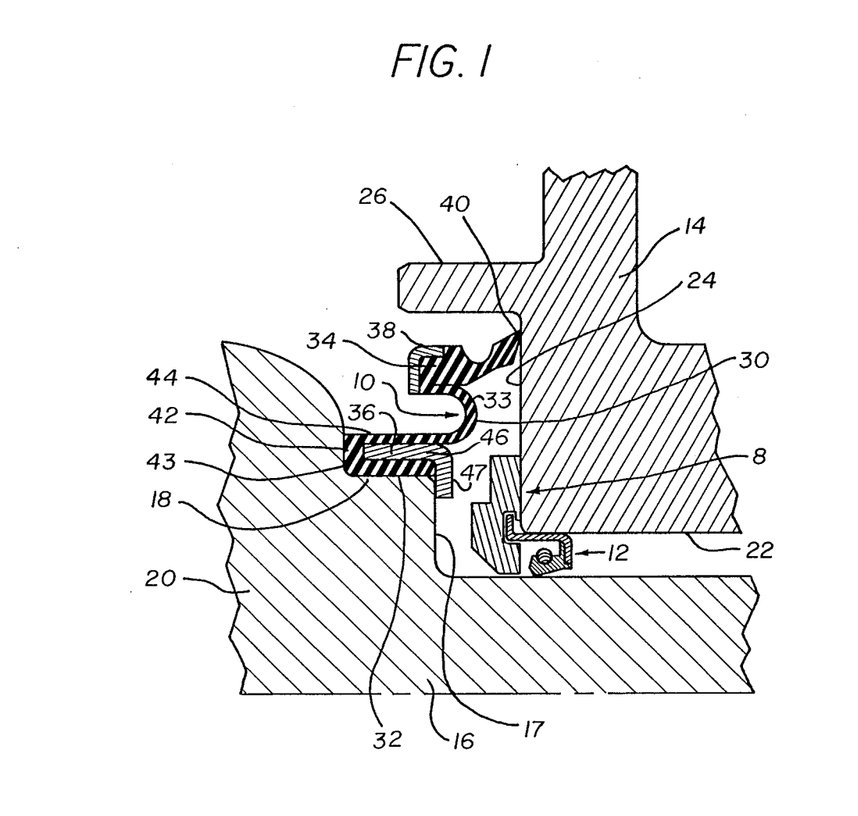
FIG. 1 is a cross-sectional view of a preferred form of seal assembly in accordance with the present invention installed between a spindle housing and an axle shaft of a motor vehicle.
Figure 2:
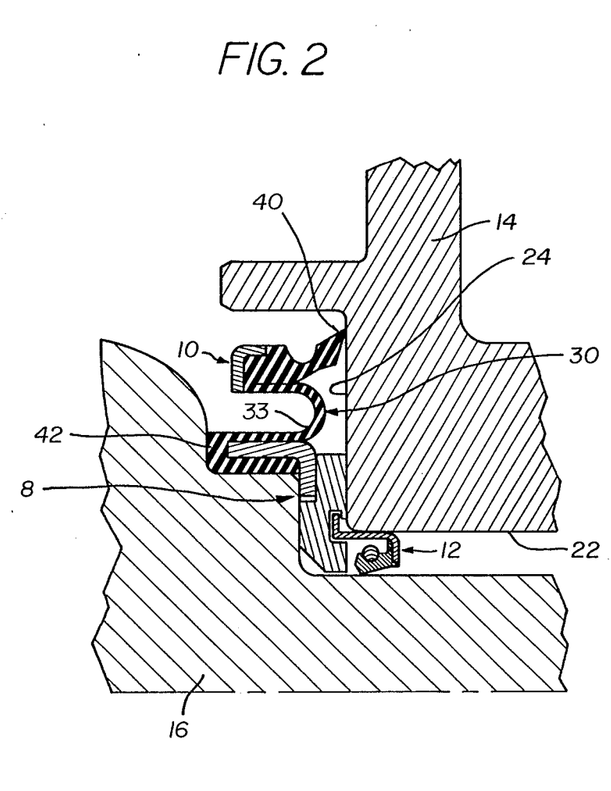
FIG. 2 is a cross-sectional view similar to FIG. 1 and illustrating the relative movement between parts when the shaft is axially displaced with respect to the spindle housing.

There is shown by way of illustrative example in FIGS. 1 and 2 one preferred form of seal assembly 8 broadly comprised of a rotary facial seal 10 and a thrust bearing unit 12 interposed between two inner and outer spaced, relatively moving members 14, 16. As a setting for the present invention, the seal assembly 8 is shown installed between an outer stationary spindle housing 14 and an inner drive shaft or axle 16 of a motor vehicle. The axle 16 terminates at its outboard end in a radial surface portion 17, axially directed shoulder 18 and enlarged end 20. Conventionally, the spindle housing 14 has inner bore 22 in outer spaced facing relation to the shaft 16, a radially extending wall surface 24, also referred to as a counterface, in facing relation to the radial wall 17 of the shaft 16 and a circular flange 26 projecting outwardly from the outboard end of the housing 14.

Preferably the shaft 16 has a linear axis about which it may rotate, and the spindle housing bore 22 is located about part of the shaft such that the bore and shaft are concentric or substantially concentric. In a sense, then, the spindle housing 14 may be at least partly concentric with the shaft. Precise concentricity is not necessarily a restriction for proper use and operation of the invention; indeed concentricity ordinarily would not be required for use and operation of the invention.

In the above setting, the facial seal 10 is so mounted between the spindle housing 14 and shaft 16 as to prevent ingress of dust, water or other contaminants into the space or area between the housing 14 and shaft 16 and at the same time to prevent the migration of lubricant, such as grease, out of that area. In establishing an effective seal, the facial seal 10 is capable of compensating for liberal end-play and shaft misalignment as well as a lesser degree of axial biasing when the shaft is either rotating or not rotating in relation to the housing 14. Moreover, the facial seal 10 has been found to be effective under negative pressure to hold relatively securely against the counterface 24 thereby maintaining the integrity of the seal.

Figure 6:
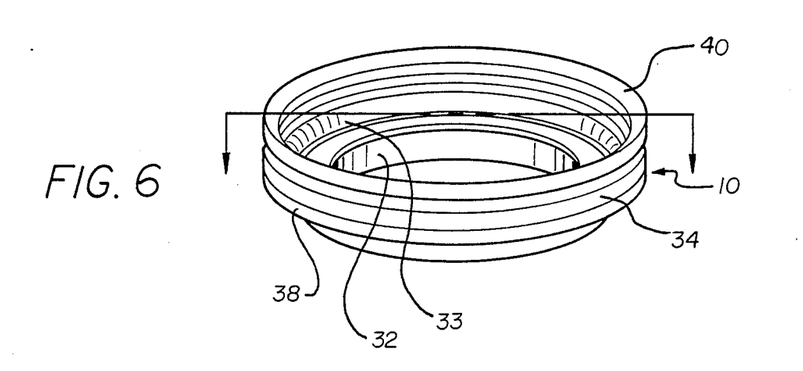
FIG. 6 is a somewhat perspective view of a preferred form of seal according to the invention.
Figure 7:
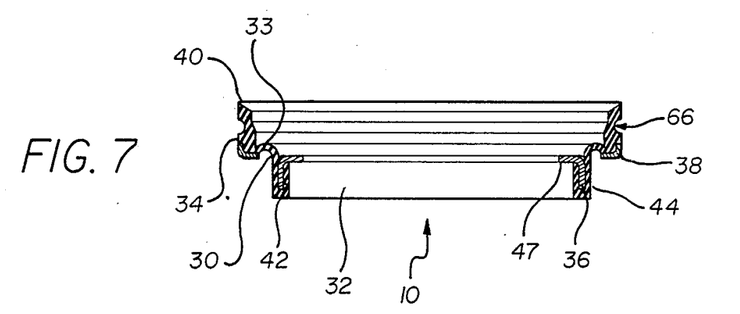
FIG. 7 is a cross-sectional view taken about lines 7—7 of FIG. 6.

The overall construction and arrangement of the seal 10 may be best seen from a consideration of FIGS. 6 and 7, the seal 10 comprising a diaphragm 30 of elastomeric or rubber or rubber-like material having an inner seating portion 32, a generally toroidal shaped wall section 33 and outer concentric seal body 34. The inner concentric seating portion 32 is affixed to a ring member 36, which is relatively more rigid than the diaphragm so that when the seal 10 is installed onto the shaft 16 as shown in FIGS. 1 and 2 in a manner to be described, the seating portion 32 is compressed between the rigid ring 36 and the shaft 16. An outer backing ring member 38 also is a rigid member which is permanently affixed to the seal body 34 in outer spaced concentric relation to the inner seating portion 32 and functions to maintain the integrity of the seal body, and acts as a directional fulcrum through which the force imparted from translational or rolling movement of the wall 33 is applied via seal body 34 to a tapered seal lip 40 at the end of the seal body 34 which is in facing relation to the spindle housing 14 as shown in FIGS. 1 and 2. In other words, the toroidal wall section 33 is capable of axially loading or biasing the seal lip 40 against the spindle housing 14 when axial or translational movement occurs between the shaft 16 and housing 14 without the aid of separate biasing or spring elements.

Figure 5:
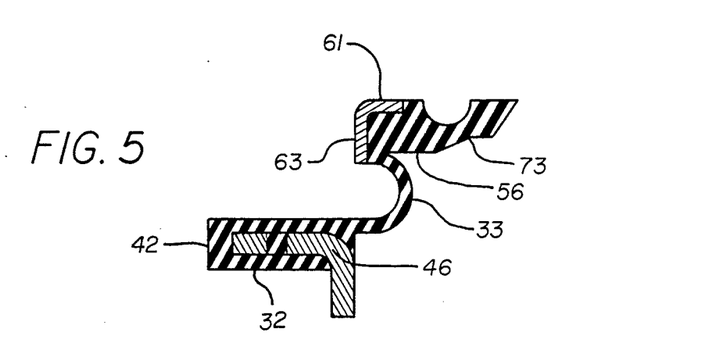

The necessary resilience is incorporated into the toroidal shaped, flexible wall 33 of the diaphragm so as to act very much in the manner of a cantilever in yieldingly urging the seal lip 40 into constant engagement with the radial wall of the spindle housing 14 notwithstanding axial movement between the shaft 16 and housing 14. The free, or relaxed, state of the wall section 33 is shown in FIG. 5; i.e., the wall section 33 is molded into a configuration such that, as it advances toward the relationship shown in FIG. 3, it will store an increasing biasing force tending to return it to the position shown in FIG. 5. The combination of the biasing force built into the wall section 33 and rolling action of the diaphragm will cause, in combination with the limitations or constraint imparted by the backing ring 38, that biasing force to be exerted in an axial direction upon the seal lip 40.

Figure 3:
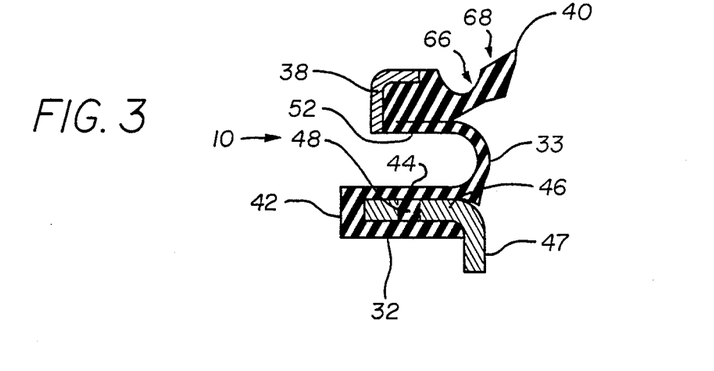
FIGS. 3, 4 and 5 are cross-sectional views of the seal and illustrating the rolling action of the diaphragm in response to relative axial displacement between the shaft and housing of FIGS. 1 and 2.
Figure 4:
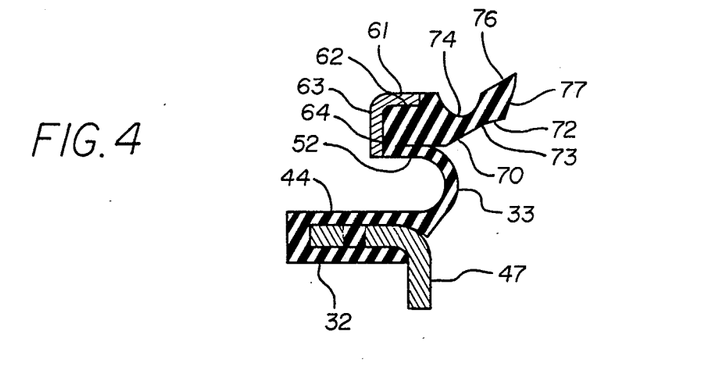

Referring in more detail to the construction and arrangement of elements comprising the seal 10, and with specific reference to FIGS. 3 to 5, preferably the seating portion 32 defines one side or leg of a generally U-shaped inner terminal end section 42 of the diaphragm 30, the opposite side or leg 44 defining an axially directed, outboard continuation of the toroidal shaped wall section 33, and a closed end 43 of the section 42 joining the seating portion 32 and leg 44. The rigid ring 36 is of generally L-shaped cross-section and is preferably composed of a rigid metal material including an axially extending flange 46 inserted through the open end of the U-shaped section 42 and a radially inwardly directed flange 47 at one end of the flange 46. Preferably, the ring 36 is mechanically held in place and united with the seating portion 32 by forming a series of holes or bores 48 through the flange 46 and through which the elastomeric material of the diaphragm 30 flows during the molding process of the diaphragm. Mechanical bonding in the manner described avoids necessity of chemical bonding and enables the ring 36 to be united with the inner seating portion 32 and inner leg 44 during the molding or curing process.

Construction of the seating portion 32 and ring 36 in the manner described greatly facilitates installation of the diaphragm onto the shaft with the inwardly directed flange 47 bearing against the radial wall 17 of the shaft. No special surfaces are required for the shaft or mating surface of the ring and no special tools required for the installation of the seal onto the shaft 16. The facial seal 10 simply may be pushed onto the shaft 16 until the ring 36 and its flange 47 are advanced into abutting relation with the shoulder 18 and radial wall 17; and when the seal 10 is fully seated on the shaft 16 the inner seating portion 32 is compressed between the ring 36 and the shaft 16.

The wall section 33 will undergo a rolling action as it flexes in response to relative movement between the outer and inner concentric members 14 and 16, respectively. Specifically, the wall section 33 is of generally toroidal or concavo-convex configuration with its convex wall surface in facing relation to the outer member 14. Further, the wall section is of uniform thickness in extending from the inner leg 44 across the generally circular or arcuate wall proper, as designated at 33, into an axially extending, outer concentric end or leg 52. The outer end 52 of the wall 33 is integrally united to the outboard end of the seal body 34 and is free to roll along inner surface 56 of the seal body in response to translational or axial movement of the shaft 16 as described. Again, in order to impart the necessary biasing action to the seal lip 40, the diaphragm 30 is molded so that in its relaxed state it is in the inboard extended position shown in FIG. 5. Specifically, the outer peripheral end or leg 52 of the wall section 33 is joined to the seal body at an angle such that movement of the inner seating portion 32 in an axial direction toward the radial wall, as noted in the succession of movement illustrated in FIGS. 4 and 3 will cause the outer end 52 to roll outwardly along the inner circumferential surface of the seal body. Conversely, as the inner seating portion 32 is moved axially away from the radial wall toward the extended position shown in FIG. 5, the outer end 52 will continue to yieldingly urge the seal lip 40 against the radial wall. This biasing force exerted by the outer end 52 is assisted by the resiliency or biasing action of the entire wall section 33 and inner leg or end 44.

The seal body 34 preferably is in the form of a solid, generally rectangular solid block of a greater radial thickness than the remainder of the body to be described so as to be relatively inflexible with respect to the sealing lip 40. The backing ring 38 is of generally L-shaped cross-section and is molded into the body 34 with axially directed flange 61 molded into an outer circumferential surface 62 of the block and flange 63 molded into radially directed outboard end surface 64 of the block. As previously noted, the backing ring 38 is a rigid member to maintain the integrity or uniformity of the diameter of the seal body and to act as a directional fulcrum through which the force imparted from rolling of the wall section 33 is directed into the face of the seal lip 40. The seal body 34 converges at the end opposite to the backing ring 38 into a hinged section 66 and thereafter continues into tapered section 68 which terminates in the sealing lip 40. Preferably, the hinged section 66 is defined by inclined surfaces 70 and 72 intersecting along a common circumferential line of intersection 73. Hinging occurs at the intersection 73 of the surfaces 70 and 72 by reducing the cross-sectional thickness of the section behind the hinge, preferably by forming an outside circumferential groove or radius 74 which is offset slightly outboard of the hinge line 73. An outer circumferential surface 76 inclines radially and outwardly to intersect with a radially outwardly directed surface 77 and converge at the sealing lip 40 as illustrated. The combination of the location of the hinge line 73 and groove 74 permits radially outward flaring of the seal lip 40 about the hinge 73 when the lip 40 bears against the sealing interface defined by the radial wall 24 of the spindle housing. This outward hinging or flaring also acts as a secondary means of loading the seal lip 40 axially in the same fashion as a spring would act to direct force in a linear or axial direction. The surface 77 adjacent to the sealing lip 40 is inclined at a steep radial angle so as to define a thin band of sealing contact when flared outwardly as described and enables the sealing force to be spread over a broad surface area on the radial wall 24 of the housing 14. By spreading the force over a broader surface area, the seal lip is capable of running at high speeds with minimal heat build-up and wear on the surface 77, and the axial biasing action of the diaphragm enhances sealing contact along the entire circumferential surface of the sealing lip with the radial wall surface 24. Any increased biasing force or pressure exerted upon the seal lip, as the inner seating portion 32 is axially advanced toward the radial wall is accommodated by the outward flaring or hinging action of the seal lip about the hinge line 73.

DETAILED DESCRIPTION OF THRUST BEARING

Figure 8:
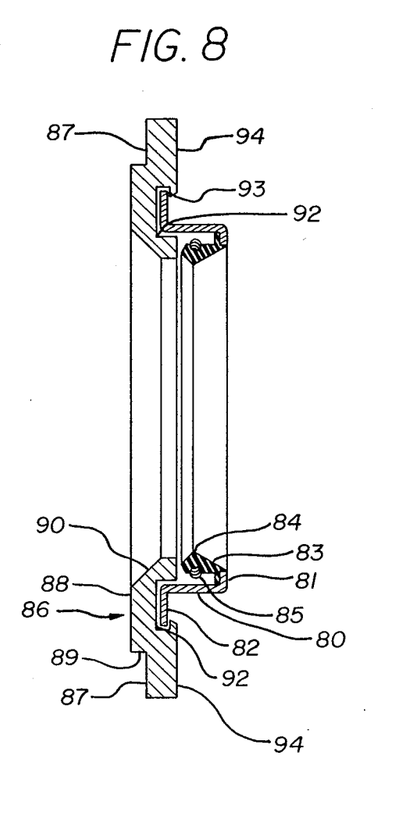
FIG. 8 is a front view in elevation of a preferred form of thrust bearing unit.
Figure 9:
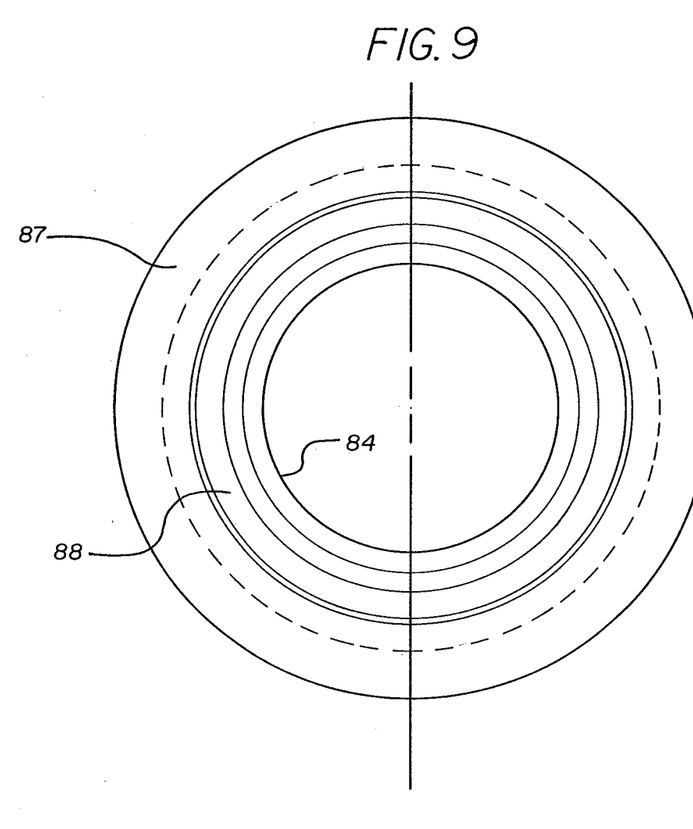
FIG. 9 is a cross-sectional view of the thrust bearing unit shown in FIG. 8.

As illustrated in detail in FIGS. 8 and 9, a preferred form of thrust bearing 12 is of generally annular configuration and is mounted at the inner bore of the spindle housing in sealed relation to the shaft 16 and in journaled relation to the housing 14. The thrust bearing 12 comprises a seal retainer ring 80 having a radially inwardly directed end flange 81 and a radially outwardly directed end flange 82 at the opposite end of the ring 80. An annular seal 83 includes a seal lip 84 at its inner radial end and an endless coiled spring member 85 in outer surrounding relation to the seal which acts to compress the seal in an inward radial direction against the surface of the shaft 16. A bearing member 86 is composed of a hard, rugged plastic material, such as, an internally lubricated Nylon composition characterized by having a low dynamic coefficient of friction. The bearing member 86 is given a cross-sectional configuration complementary to that of the ring 47 and wall 17 so that when the end of the shaft 16 moves against the bearing member 86, it will bear against the outboard surfaces 87 and 88 as well as to force the member 86 against the radial wall 24 of the housing 14, and prevent direct frictional contact between the shaft 16 and the spindle housing 14. To this end, the bearing member 86 includes an outboard surface having a radially extending portion 87 and shoulder portion 88 with a stepped surface 89 therebetween and an inner radial end 90 which is chamfered so as to act as a guide in centering the shaft 16 when the shaft is installed within the bearing 12. By centering and guiding the shaft 16 into proper position, the seal 83 is protected from damage and the spring 85 is protected from displacement with respect to the seal 83. Inboard surface 94 of the bearing member 86 is provided with a circular groove 92 having a slight overhang 93 for snapfit insertion of the outwardly directed flange 88 on the ring 80 so that the bearing member 86 is journaled on the ring 80 and is free to spin or rotate with respect to the rest of the bearing assembly. While acting as a bearing, it is beneficial for the bearing member 86 to be able to spin freely in relation to the seal portion of the assembly, which is mounted in fixed relation to the spindle housing, so that the force of friction exerted by the end of the shaft will be applied directly to the bearing surfaces 87 and 88 as well as to inboard surface 94. Being free to rotate with respect to the spindle housing, the bearing member 86 will therefore rotate with, but at a lesser speed than, the rotational speed of the shaft.

The thrust bearing assembly 12 as described is advanced into pressfit engagement within the bore 22 of the spindle housing, preferably with the assistance of a flat tool which is pressed against the outboard surface of the bearing member 86 to force the retainer ring 80 uniformly into snug-fitting engagement with the surface of the inner bore. In this way, the bearing 12 can be installed without direct engagement with the seal 83. Moreover, as described, the bearing member 86 effectively encloses or protects the spring member 85 backing the seal 83 and protects it from displacement during installation into the bore.

DETAILED DESCRIPTION OF ALTERNATE PREFERRED EMBODIMENT

Figure 10:
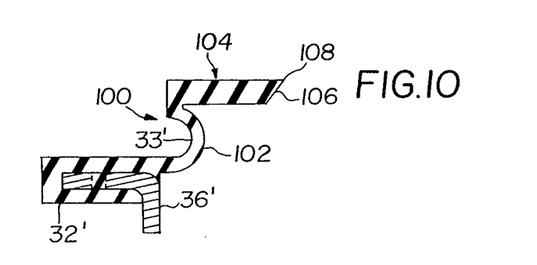
FIG. 10 is a cross-sectional view of another preferred form of seal.
Figure 11:
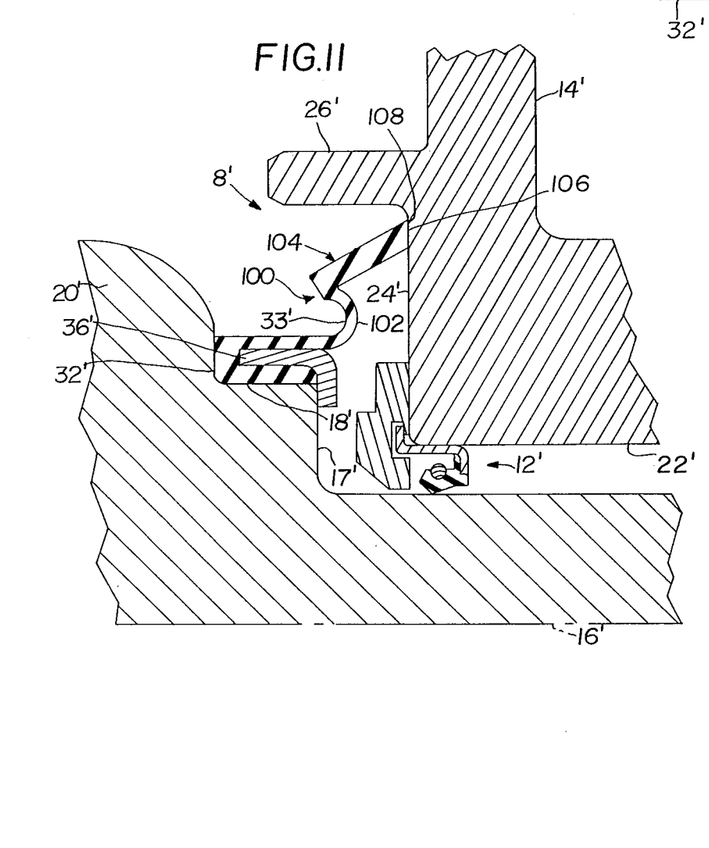
FIG. 11 is a cross-sectional view of the preferred form of seal of FIG. 10 installed between the spindle housing and axle shaft of a motor vehicle.
Figure 12:
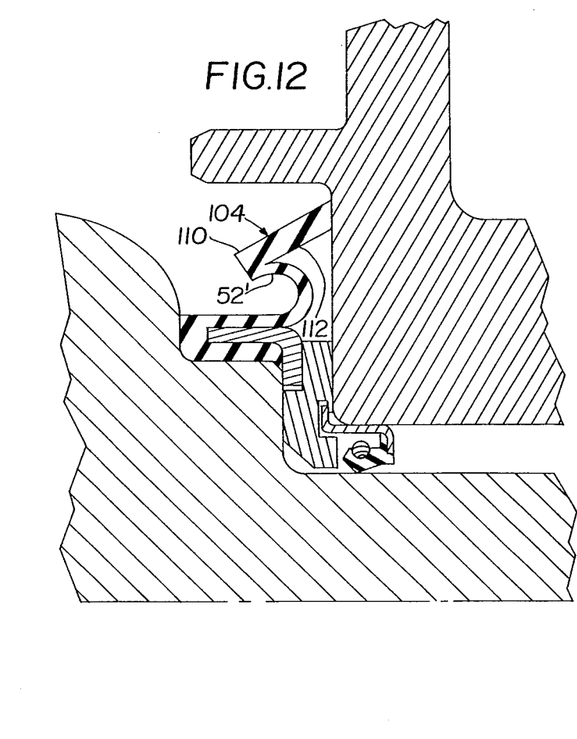
FIG. 12 is a cross-sectional view of the embodiment of FIGS. 10 and 11 illustrating the relative movement between parts when the shaft is axially displaced with respect to the spindle housing.

Referring to the preferred embodiment illustrated in FIGS. 10 to 12, like parts are correspondingly enumerated to those of the seal assembly as illustrated in FIGS. 1 to 8. Thus, a modified form of seal assembly 8' comprises a rotary facial seal 100 and a thrust bearing unit 12' interposed between the members 14' and 16', the member 14' again designating an outer stationary spindle housing and member 16' designating an inner drive shaft having a radial surface 17', shoulder 18' and enlarged end 20'. Housing member 14' has an inner bore 22', radial wall surface 24' and circular flange 26'.

The facial seal 100 again comprises a diaphragm 102 of elastomeric material having an inner seating portion 32', a generally toroidal shaped wall section 33' and an outer seal body 104. The seating portion 32' is affixed to a ring member 36' in a manner corresponding to that of the form of seal 10 shown in FIGS. 1 and 2, and the toroidal-shaped wall section 33' is constructed and arranged in a manner corresponding to that of the wall section 33 of the seal 10 for the purpose of yieldingly urging the outer seal body 104 into constant engagement with the radial wall 24' of the housing 14' notwithstanding axial displacement of the housing 14' and the shaft 16'.

An important feature of the form of invention shown in FIGS. 10 to 12 is the modified construction of the outer seal body 104 so as to be of substantially uniform cross-sectional thickness throughout, except for a tapered surface portion 106 which terminates in a seal lip 108 at the free end of the seal body 104 opposite to connecting end 110. As shown, the surface portion 106 inclines at a low gradual angle away from the inner circumferential wall surface of the seal body until it intersects with the outer circumferential wall surface. The connecting end 110 is integrally formed with the outer end or leg 52' of the toroidal wall section 33', and the thickness at the connecting end 110 is increased by that of the leg 52', and is greater than that of the toroidal wall section 33' so as to be relatively inflexible with respect to the toroidal section 33'. The seal body as described has sufficient integrity at its connection to the toroidal wall section 33' to act as a directional fulcrum through which the force imparted by the rolling action of the wall section 33' can be directed into the face of the seal lip 108 without requiring a backing ring, such as, the backing ring 38 as shown in FIGS. 1 to 8.

In order to impart the necessary biasing action to the seal lip 108, the entire diaphragm 102 is molded so that in its relaxed state it will assume the inboard extended position shown in FIG. 11 with the seal body 104 diverging slightly in an outward radial direction from the connecting end 104 to the opposite free end portion 106. Movement of the inner seating portion 32' axially towards the radial wall 24', as noted in FIG. 12, will cause the wall section 33' to roll in an outboard direction away from the face or wall 24' along the inner circumferential surface 112 of the seal body 104. Conversely as the inner seating portion 32 is moved axially away from the wall 24' toward the position shown in FIG. 1, the wall section 33' and its outer end 52' will continue to yieldingly urge the seal lip 108 against the wall 24'.

In applications requiring high speeds of rotation between the relatively moving members, in the absence of a rigid backing ring, such as, the backing ring 38 referred to in connection with FIGS. 1 to 8, the frictional wear and heat build up are reduced while maintaining the necessary loading on the seal lip for uniform contact with the radial wall surface 24'. Also the seal body is free to follow the rolling action of the toroidal wall section 33' under axial displacement as well as misalignment and endplay between the members 14' and 16' while continuing to urge the sealing lip into a thin annular band of contact with the radial wall 24'.

The design and construction of the rotary facial seal assemblies 10 and 100 are such that no special tooling is required for the installation of either assembly onto the shaft 16 or 16'; nor are special modifications required either to the surface of the shaft or spindle housing. Moreover, either seal assembly 10 or 100 simply may be pushed onto the shaft 16 or 16' until the ring 36 or 36' is firmly seated as illustrated with the inner seating portion 32 or 32' compressed against the surface portion of the shaft 16'. In this regard, it will be evident that the inner seating portion 32 or 32' and ring 36 or 36' may be modified according to the particular configuration of the shaft or enlarged portion of the shaft upon which it is to be mounted. Similarly, the dimensioning of the entire diaphragm 30 or 102 can be appropriately modified to conform to different mounting conditions and variation in sizes between the members to be sealed. Similarly, the materials described for use in connection with the preferred form of seal and bearing assemblies have been given more for the purpose of illustration but not limitation. It is important, however, that the composition of the diaphragm 30 or 100 be such that it can be operated or worked well within its pressure/velocity limits and possess a low compression set.

It is therefore to be understood that while preferred embodiments of a seal and bearing assembly have been described, various modifications and changes may be made in the construction and arrangement of each together with the specific composition of materials employed therein without departing from the spirit and scope of the present invention as defined by the following claims.

I claim:

1. A seal assembly for installation between radially inner and radially outer spaced, relatively movable members, there being a radially extending circumferential surface on said outer member to be sealed with respect to said inner member, said seal assembly comprising:

an annular diaphragm having a radially inner seating portion disposed around said inner member in sealing engagement therewith, a seal body, an outer circumferentially extending seal lip, and resilient means defined by a generally toroidal shaped annular wall section of resilient deformable material, said wall section having a convex portion facing said circumferential surface and extending between said seating portion and said seal lip to yieldingly urge said seal lip against said circumferential surface of said outer member notwithstanding relative movement between said inner and outer relatively movable members, said seal body united with and extending circumferentially around an outer peripheral edge of said wall section and said seal lip tapering in an axial direction away from said seal body into sealing engagement with said circumferential surface at a location radially outwardly of said seal body.

2. A seal assembly according to claim 1, said wall section being of generally concavo-convex-C-shaped configuration with its convex surface facing toward said circumferential surface.

3. A seal assembly according to claim 1, said seal body extending axially toward circumferential surface, and a circumferential hinge portion of reduced thickness located intermediately between said seal body and said seal lip.

4. A seal assembly according to claim 1, including a rigid mounting ring on said inner seating portion and a rigid backing ring member mounted on said seal body.

5. A seal assembly according to claim 1, including an annular bearing member disposed in abutting relation to said circumferential surface and in inner spaced concentric relation to said seal lip, said bearing member being axially spaced in facing relation to said inner seating portion, and means mounting said bearing member in journaled relation to said outer member.

6. A grease seal assembly for installation between a radially outer concentric stationary spindle housing and a radially inner concentric, relatively movable shaft of a motor vehicle, said shaft being rotatably and axially movable with respect to said housing, and there being a radial wall on said housing facing in a direction toward a portion of said shaft to be sealed with respect to said housing, said seal assembly comprising:

an annular diaphragm composed of elastomeric material having a radially inner seating portion disposed concentrically around and in fixed sealing engagement with said shaft, an outer, circumferentially extending seal body including a seal lip extending radially and axially away from said seal body, and an annular resilient wall section extending between said seating portion and said seal lip, said diaphragm including means to yieldingly urge said seal lip against said radial wall of said housing notwithstanding axial movement of said shaft with respect to said housing and an annular bearing member disposed in abutting relation to said radial wall and in inner spaced concentric relation to said seal lip, said bearing member being axially spaced in facing relation to said inner seating portion, and means mounting said bearing member in journaled relation to said outer member, said mounting means including a retainer ring having a radially outwardly extending flange inserted in a groove in said thrust bearing member.

7. A grease seal assembly according to claim 6, including an annular seal secured to said retainer ring for engagement with the outer surface of said radially inner concentric member.

8. A grease seal assembly according to claim 6, including biasing means between said retainer ring and seal to yieldingly urge said seal into contact with said radially inner concentric member.

9. In a seal assembly for installation between a radially outer annular member and a relatively movable radially inner member, there being a first surface to be sealed on said annular member and a second surface to be sealed on said inner member, an annular diaphragm having a seating portion in sealing engagement with one of said first and second surfaces, a sealing body portion having a seal lip engageable with the other of said first and second surfaces, resilient means defined by a generally C-shaped annular wall section of resilient deformable material extending between said seating portion and said sealing body portion to yieldingly urge said seal lip into sealing engagement with said other of said first and second surfaces to be sealed notwithstanding relative movement between said inner and outer members, said wall section having a convex surface facing said other of said first and second surfaces, said sealing body portion united with and extending circumferentially around a peripheral edge of said wall section and said seal lip tapering in an axial direction away from said sealing body portion into sealing engagement with said other of said first and second surfaces under the urging of said wall section, said seal lip extending radially beyond all other portions of said sealing body.

10. In a seal assembly according to claim 9, said sealing portion extending axially toward said first surface, and a circumferential hinge portion of reduced thickness located intermediately between said sealing portion and said seal lip.

11. In a seal assembly according to claim 9, including a rigid mounting ring on said seating portion and said sealing portion including a seal body at the outer peripheral edge of said wall section.

12. In a seal assembly according to claim 9, said sealing portion having a connecting end portion integrally united with and extending circumferentially around an outer peripheral edge of said wall section, an axially extending seal body of substantially uniform cross-sectional thickness and an opposite free end portion in the form of said seal lip tapering in an axial direction away from said seal body into sealing engagement with said first surface under the urging of said wall section.

13. In a seal assembly according to claim 12, said seal lip formed by the intersection of an outer circumferential, axially extending wall of said seal body and an inclined surface tapering at a low gradual angle away from an inner circumferential wall surface of said seal body to said outer circumferential wall surface.

* * * * *